April 7, 1970　　　　　　A. BARTHEL　　　　　　3,504,820
SPACED WALL RECEPTACLE HAVING WOUND COMPOSITE
INSULATION BETWEEN THE WALLS
Original Filed April 1, 1966　　　　　　　　7 Sheets-Sheet 4

INVENTOR.
ALFRED BARTHEL

April 7, 1970  A. BARTHEL  3,504,820
SPACED WALL RECEPTACLE HAVING WOUND COMPOSITE
INSULATION BETWEEN THE WALLS
Original Filed April 1, 1966  7 Sheets-Sheet 5

INVENTOR.
ALFRED BARTHEL

INVENTOR.
ALFRED BARTHEL

INVENTOR.
ALFRED BARTHEL

United States Patent Office

3,504,820
Patented Apr. 7, 1970

3,504,820
SPACED WALL RECEPTACLE HAVING WOUND COMPOSITE INSULATION BETWEEN THE WALLS
Alfred Barthel, Indianapolis, Ind., assignor to Union Carbide Corporation, a corporation of New York
Original application Apr. 1, 1966, Ser. No. 545,517. Divided and this application Nov. 26, 1968, Ser. No. 794,823
Int. Cl. B65d 25/18
U.S. Cl. 220—9   5 Claims

ABSTRACT OF THE DISCLOSURE

A spaced wall container for low boiling liquefied gases, such container having cylindrical side walls of substantially circular cross-section and end walls of substantially spherically convex shape, the space between the walls of such container being filled with composite insulation wherein strips of insulation of a low thermally conductive material and strips of insulation of a radiation reflective material are longitudinally wrapped about the inner wall of the container and other strips of low thermally conductive material and radiation reflective material are wrapped girth-wise about the cylindrical side walls of the container.

---

This is a division of application Ser. No. 545,517, filed Apr. 1, 1966.

This invention relates to a space wall receptacle or container for storing low-boiling liquefied gases, having wound layers of composite insulation between the receptacle walls wherein the inner vessel has a cylindrical side wall and outwardly protruding convex-shaped end walls.

Double-walled containers are being increasingly used for the storage of low-boiling liquefied gases such as liquid oxygen and the like. Such containers comprise an inner liquid-storage vessel and an outer casing with an annular insulating space therebetween. This space is preferably filled with insulating material and maintained under a vacuum (very low absolute pressure) so as to minimize the heat inleak by convection and resulting loss of evaporated liquid. A particularly effective insulation is the composite layered type comprising a low thermally conductive material layer and a radiation-reflective material layer. The layers may be physically attached to each other as exemplified by aluminum coated polyethylene terephthalate film, but are preferably separate and distinct for maximum resistance to the conduction and radiation modes of heat transfer. A highly efficient composite insulation consists of fibrous sheeting as the low conductive layer and metal foil as the radiation-reflective layer. In particular, sheeting of glass paper or web, and aluminum or copper foil in contiguous alternating sequence is a widely used composite insulation for cryogenic systems, as described more fully in U.S. Patent Nos. 3,007,596, 3,009,600 and 3,009,601.

These composites are conformably spirally wrapped around the inner vessel of double-walled containers under suitable tension. They are readily adaptable to the side walls of cylindrical shaped vessels but less suitable to cover the end walls of such vessels, which may be flat or convex-shaped. It is often possible to hand-wrap the composite layered insulation by folding over the ends of the material applied to the side, taking care to insure that each radiation-reflective layer is completely separated from adjacent reflective layers by a low conductive material layer. The latter is necessary to avoid thermal "short-circuiting," i.e. a direct path for heat transfer through the multiple layers from the relatively warm surrounding environment to the relatively cold cryogenic liquid. However, hand wrapping is time consuming, cumbersome and relatively expensive. Another disadvantage of hand wrapping is that it causes non-uniformity in the insulation thickness (number of composite layers per inch of cross-section) thus lowering the insulation efficiency. The non-uniformity problem may be overcome by cutting discs from the composite layered insulation, and laying a predetermined number of discs over the end, interleaving carefully each disc with a corresponding spirally wrapped layer. This procedure however is very time consuming and costly.

Another problem is that the preferred radiation-reflecting layers such as metal foil materials are thin and must be handled with great care as they may tear because of uneven or undue tension or other reasons. Applying the same tension to the foil and to the fiber sheeting is furthermore undesirable, because the fiber sheeting is considerably weaker in tension than the foil.

I have discovered that composite multi-layered insulation may be efficiently wrapped around the periphery of spherical vessels. In this method, strips of the composite insulation are applied to the vessel as the latter revolves around an axis—usually a vertical axis through the vessel neck tube, on any suitable holding means. As the vessel revolves, the strips are applied from reels which orbit around the vessel. This method affords a uniform insulation density (comprising multiple layers) on the outwardly protruding convex-shaped end walls of cylindrical vessels. However, such method is not satisfactory for the cylindrical side wall because the composite insulation layer density cannot be effectively controlled at the sides, so that a uniform insulation density over the complete periphery of the vessel is next-to-impossible. This is due to the fact that the radial force component of a ribbon wrapped axially (from pole to pole) around a cylindrical vessel is very small. The insulation has, therefore, a tendency to build up very fast into a rather loose texture. This becomes more pronounced the longer the cylinder is.

It is therefore an object of the present invention to provide a double-walled cryogenic liquid storage container having an inner vessel with cylindrical side walls and outwardly protruding convex-shaped end walls, with a composite insulation of low conductive material layers and radiation-reflective material layers in alternating sequence surrounding the entire periphery of such vessel under substantially the same density.

Other objects, features and advantages of the invention will be apparent from the following detailed description of preferred embodiments taken in conjunction with the attached drawings in which.

Figure 1:
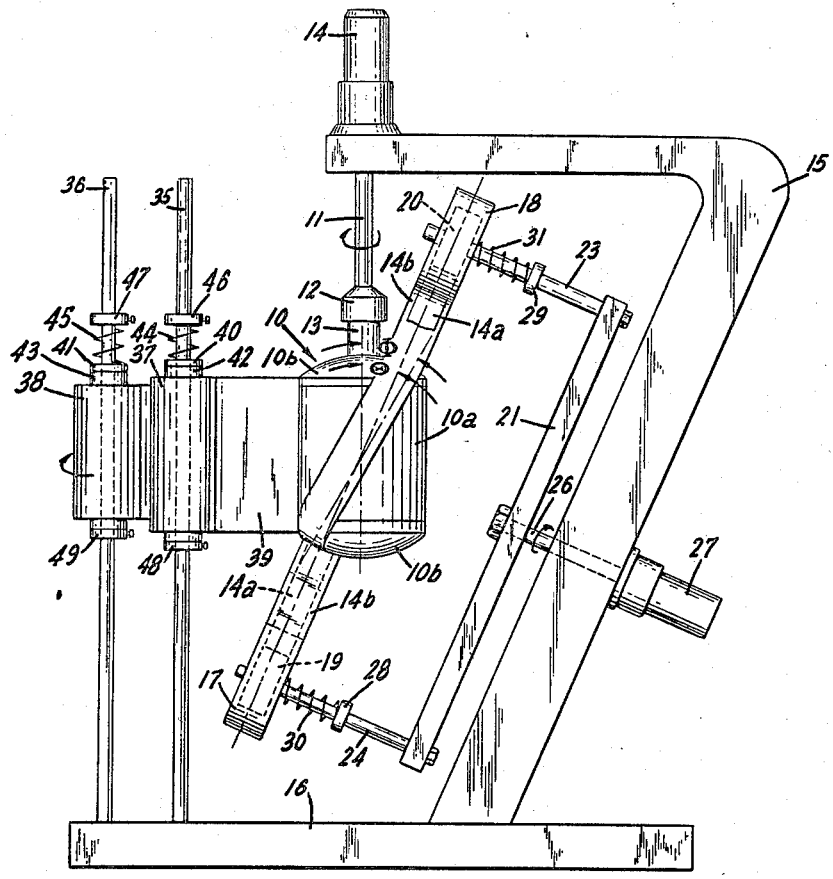
FIG. 1 is a longitudinal elevation view of one side of a wrapping machine embodiment of the invention.

Basically the present invention represents an advantageous and unexpected combination of spiral wrapping and orbital wrapping. The composite multi-layered insulation is spirally applied to the cylindrical side wall as the vessel revolves, and the orbit wrap is applied either simultaneously or separately without the spiral wrap. Whether the spiral-orbital combination will be applied simultaneously or alternatively is basically a function of achieving uniform density and thickness of multi-layered composite insulation around the entire periphery of the vessel. As previously indicated, such uniformity is necessary for the insulation to be isothermal in all parts of the periphery. As used herein, the term "simultaneously" means that the spiral and orbital wrap are applied to the vessel periphery at the same time. The term "alternatively" means that in a given period either the orbit or the spiral wrap is applied alone.

Apparatus is provided for wrapping a composite insulation of low thermally conductive layered material and radiation-reflective layered material around the periphery of a vessel having a cylindrical side wall and outwardly protruding convex-shaped end walls. This apparatus includes a main frame and a support carried by the frame and adapted to vertically rotate the vessel on its end-to-end axis. A rotatable arm is mounted on the frame and has at least one shaft attached to an end thereof for supporting a rotatable roll of the insulation and extending said roll toward the vertical axis of vessel support. The shaft is movable by the arm in an orbital path about the vertical axis and at an acute angle therefrom so as to wrap the composite insulation around the periphery of the rotating vessel. Tensioning means are associated with the shaft for imparting compression to the rotatable roll.

Vertically rotatable shaft means are attached to the frame and adapted to vertically support a rotatable roll of the insulation for spirally wrapping the composite insulation around only the cylindrical side wall of the rotating vessel. Tensioning means are associated with the vertically rotatable shaft means for imparting compression to the composite insulation during the spiral wrapping. Drive means are provided for controllably rotating the vessel support, the arm and the shaft.

The composite multi-layered insulation may for example be supplied as rolls of the metal-coated flexible plastic material described in U.S. Patent 3,018,016 or in preformed layers of metal foil and fibrous sheet. In this event only one roll of the metal foil-fibrous sheet composite insulation is needed for attachment to a shaft on the end of the orbiting arm, and one roll is needed for attachment to the vertically rotatable shaft for spiral wrapping around the vessel.

Usually, however, it will be preferable to wrap the composite insulation simultaneously with layers of insulation fed from opposite ends of the rotatable arm. This would in turn require two shafts, one near each end of the rotatable arm, when the insulation is of the preformed composite type mentioned above. When the insulation is of the preferred metal foil-fibrous sheeting layer type and is not supplied in composite form, four rolls would be preferably required, two rolls adjacently positioned near each of the opposed ends of the rotatable arm. Each pair of rolls are adjacently positioned so that composites of fibrous sheeting underlayer and metal foil overlayer are simultaneously applied from top to bottom on opposite sides of the vertically rotatable vessel in intersecting angles. Similarly when the preferred metal foil-fibrous sheeting layer type of insulation is not supplied in the composite form, two vertically rotatable shafts are needed to support rotatable rolls of the fibrous sheeting and the metal foil for spiral wrapping the composite insulation around the cylindrical side wall of the rotating vessel.

A pair of rotatable arms is provided and mounted for rotation on the main frame. A pair of rotatable rolls are mounted near each end of each of these arms. Each pair of rolls are positioned inwardly toward the vertical axis of the vessel support so that they are movable in an orbitable path about the vessel as the arms rotate. This path may be described by a plane intersecting the vertical axis of the vessel support at an acute orbit angle therefrom of between 8 and 30 degrees.

Means are also provided for adjustably changing the orbitable path of the rolls in increments within the orbit angle of 8 and 30 degrees. This is preferably achieved by pivotally mounting the rotatable arms on the main frame so that by pivotally adjusting the arms, the rolls which are mounted thereon will be caused to move with the arms in any desired orbital path within an orbital angle of 8 and 30 degrees from the vertical axis of the vessel support.

Figure 2:
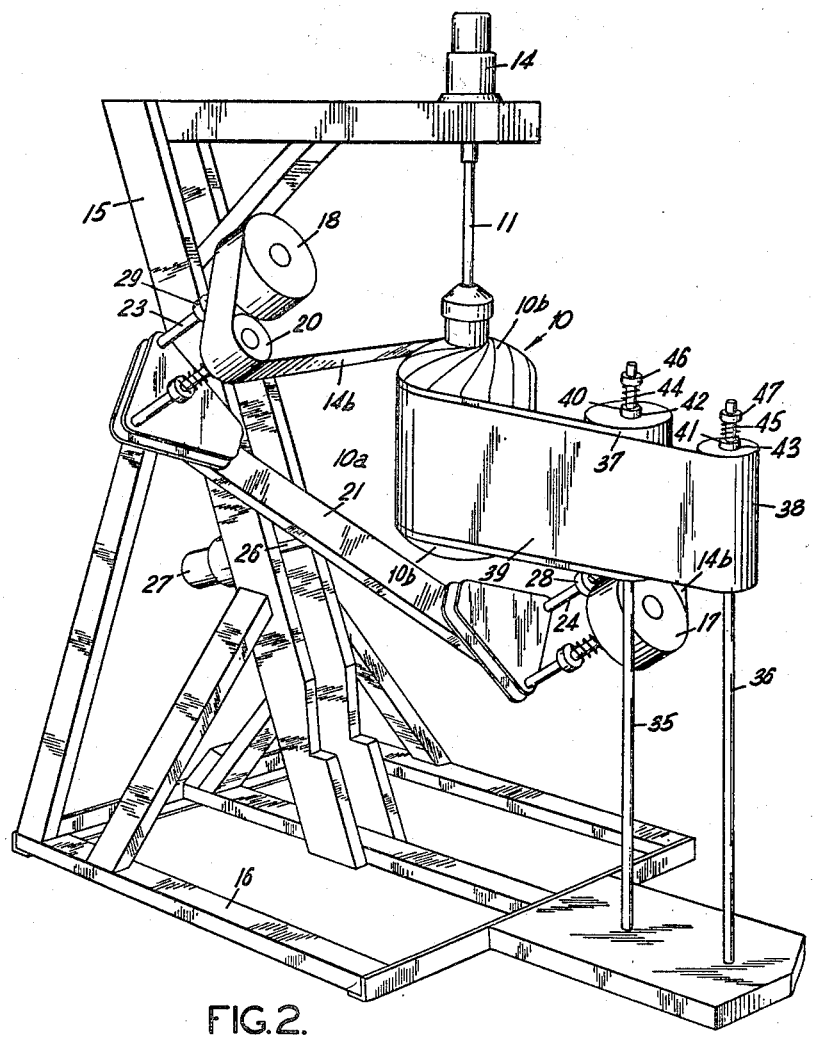
FIG. 2 is an isometric view of one side and the front of the FIG. 1 wrapping machine.

Referring now to FIGS. 1 and 2, the vessel 10 to be wrapped is supportably held by a vertically aligned shaft 11 through a suitable collar 12 which is connected to the neck tube 13 of the vessel. Shaft 11 in turn is connected to a suitable drive 14 so as to rotate the vessel about its vertical end-to-end axis. The drive may consist of any type of motor and speed reducing gears necessary to obtain the desired rotating speed of the container. The vessel 10 to which the composite insulation is applied may, for example, be the inner liquefied gas holding vessel of a double-walled container. It has cylindrical side wall 10a and outwardly protruding convex-shaped end walls 10b. The rotating or driving means for the vessel 10 are supported by a suitable frame 15 which in turn is secured to base 16.

First and second rotatable rolls 17 and 19 for feeding fibrous sheeting and metal foil respectively are attached to motion arm 21 through respective shafts 22 and 24 so as to be orbitable, as they rotate, about the vertically rotatable vessel 10. The roll rotation speed is determined by the speed of rotation of arm 21. When wrapping vessels having a small overall surface area it is often desirable to operate the machine by employing the rolls at only one end of the motion arm 21. The invention in its broadest aspects, therefore does not require a pair of rolls at opposite ends of the motion arm since a pair of rolls at but one end will often suffice. Also, as aforementioned, when utilizing a preformed composite insulation, e.g. the metal-coated flexible plastic material disclosed in U.S. Patent 3,018,016 issued Jan. 23, 1962 to M. P. Hnilicka, Jr., the invention may be practiced with but one roll at one end of motion arm 21.

Since it is usually desirable to utilize rolls at opposite ends of motion arm 21 in the wrapping of containers having a large surface area, provision for additional rolls at the opposite end of motion arm 21 should preferably be made. Thus third and fourth rolls 18 and 20 for feeding fibrous sheeting and metal foil respectively are attached to motion arm 21 through respective shafts 23 and 25 so as to be orbitable, as they rotate, about the vertically rotatable vessel 10. First roll 17 for feeding fibrous sheeting and third roll 19 for feeding metal foil are adjacently positioned near the opposite end of motion arm 21. The positioning is such that composite layers of fibrous sheeting underlayer and metal foil overlayer are simultaneously applied on opposite sides of the rotating vessel. In a manner similar to vessel rotating means 14, motion arm 21 carrying rolls 17–20 is driven through shaft 26 by drive means 27 which, for example, may consist of a suitable motor and speed reducing means.

Vertical shafts 35 and 36 are supported by frame base 16 and in turn support fibrous sheeting roll 37 and metal foil roll 38, respectively, free to rotate around the shafts. The ends of rolls 37 and 38 are each positioned in vertical alignment with the respective ends of the vessel's cylindrical wall 10a. In order to control the lateral density of the insulation, suitable means of braking the rolls 37 and 38 are provided on the vertical shafts. This is achieved, as shown in FIG. 1 by braking discs 40 and 41 pressing against the roll cores 42 and 43. The correct amount of pressure is exerted by suitable springs 44 and 45, compressed by suitable collar rings 46 and 47 equipped with a setscrew for adjustment. The same type of collar rings 48 and 49 positioned beneath roll cores 42 and 43 respectively, may be used to keep the rolls in the desired horizontal alignment with cylindrical side wall 10a. Instead of springs, other means may be used to provide the necessary tension of the composite insulation layer 39, as for example magnetic or pneumatic brakes.

Figure 3:
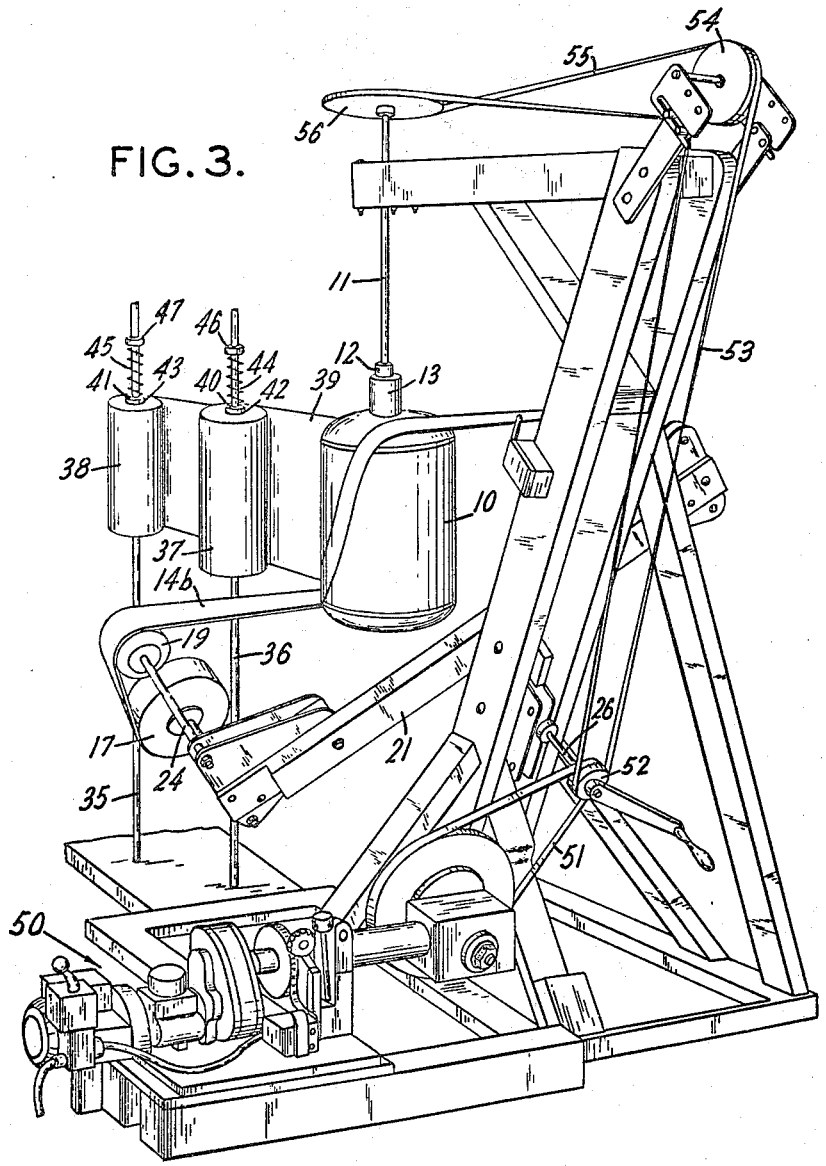
FIG. 3 is an isometric view of one side and the rear of a modified wrapping machine constructed in accordance with the invention.

It has been discovered that the insulating efficiency of vessels wrapped by the instant apparatus varies in accordance with the differences in widths of the two strips. As shown in FIGS. 2 and 3, the fibrous sheeting width is preferably significantly greater than that of the metal foil. This is to minimize the danger of the metal foil touching the foil beneath it. Should this occur, heat transfer due to solid conduction takes place. In the preferred form of the insulation, the fibrous sheet is preferably only about ¼-inch wider than the metal foil. This decreases the accumulation of void spaces, insofar as metal foil is concerned, in the space around the vessel neck tube. Such void spaces would represent a loss of radiation barriers thus increasing the heat leak to the vessel.

To illustrate by way of example the differences in heat leak resulting from varying width differences between the aluminum foil and the glass fiber, when a 25-liter, cylindrical vessel is wrapped with strips having a width difference of ¾ of an inch, the thermal conductivity is $9.0 \times 10^{-5}$ B.t.u./hr./sq. ft., °F./ft. When wrapped with a width difference of ¼-inch the thermal conductivity becomes $6.8 \times 10^{-5}$ B.t.u./hr./sq. ft., °F./ft. Thus, the smallest width difference insofar as possible will result in the smallest heat leak to the inner vessel. Both values represent a striking improvement over a conventional straight vacuum-polished wall insulating system which has a thermal conductivity of $78 \times 10^{-5}$.

As previously discussed, in operation the fibrous sheeting strip is "laid over" the metal foil strip by the orbiting arm 21 so that both can be applied to the vessel simultaneously, the fibrous sheeting being positioned in relation to the metal foil in a manner such that it will always lie beneath the foil when applied to the vessel. In the same manner the fibrous sheeting is "laid over" the metal foil from rolls 37 and 38 aligned with the ends of the vessel cylindrical wall 10a. The ends of the composite strips and sheets are then secured to the vessel 10 by suitable means such as cellophane-tape or glue. As the vessel 10 rotaes about its vertical axis, arm 21 rotates or orbits the rolls 17–20 about the vessel 10. As the arm 21 rotates, the rolls 17–20 also rotate about their own axes thus applying the composite strips of metal foil 14a and fibrous sheeting 14b to the container surface. The resulting composite insulation from orbiting arm 21 will thus consist of criss-crossing composite strips. It should be noted that since the fibrous strip 14b is being carried by the metal foil 14a, there will be substantially no tension in the former during application to the vessel, the tension in the fiber needed for unrolling from the reel being negligible. For this reason there will be substantially no tension in a material that is inherently weak.

In order to assure the proper degree of tightness on which the insulation efficiency depends, a predetermined amount of tension must be applied to the metal foil strip 14a as it is wound onto the vessel from the reel-mounted metal foil rolls 19 and 20. This tension is, for example, provided by first and second springs 30 and 31, respectively, pressing against the reels carrying first and second metal foil rolls 19 and 20. The desired spring compression in a direction parallel to the axis of roll rotation is provided by first and second set collars 28 and 29, respectively. Their setting is, for example, arbitrarily determined through experimentation. This mechanical braking action may also be provided by other means such as an electromagnetic device, as will be understood by those skilled in the art. This is, in essence, the same procedure as described earlier with respect to the spirally wrapped composite insulation layer 39.

The speed of the rotating arm 21 has a maximum value which is determined by the braking load of the metal foil strip. More specifically, in addition to the constant tension of the strip established by the springs 30 and 31, there are pronounced tension fluctuations which depend upon the speed of the arm 21. These fluctuations are originated by the nature of the reel bearings and the resistance of the air to the orbiting strip. In addition, the particular form of the vessel induces erratic inertial jerks in the strip reels. As in the case of the mechanical brake, the optimum speed must be arbitrarily determined through experimentation.

Having once determined the speed of the orbiting arm, the speed of the vessel is synchronized in a certain relationship to the speed of the arm 21. This relationship depends upon the angle between the plane of the orbiting rolls and the vertical axis of the vessel, and the angle between the wrapping strip and the vertical axis of the vessel. If these factors are not properly determined, the insulation strips form excessive wrinkles in those areas where there is a transition from one surface to another. These wrinkles will "pile up" thus forming a loose insulation mat with improper density.

For cylindrical vessels the angle $\theta$ that the plane of the orbiting reels makes with the vertical axis of the vessel is dependent upon the length of the vessel, the diameter of the vessel neck tube, and the width of the strip. The relationship may be expressed mathematically as follows:

$$\tan \theta = \frac{D_n + w}{L} \qquad (1)$$

wherein $D_n$=diameter of the vessel neck tube, L=length of the vessel, and $w$=width of the metal foil strip.

The angle $\phi$ that the applied composite wrapping strip makes with the vertical axis of the vessel results from the change of one surface to another and is dependent upon the diameter of the vessel, the diameter of the vessel neck tube, and the width of the strip. Expressed mathematically:

$$\sin \phi = \frac{D_n + w}{D_c} \qquad (2)$$

wherein $D_c$=diameter of the vessel, $D_n$=diameter of the vessel neck tube, and $w$=width of the metal foil strip.

For a cylindrical vessel during the period of time in which the orbiting arm winds the foil and fibrous strips onto one of the vessel's convex-shaped end walls, the vessel must rotate through a central angle $\alpha$, whose magnitude in degrees is expressed by the mathematical formula:

$$\alpha = \frac{L(\tan \phi - \tan \theta) \times 360}{D_c} \qquad (3)$$

in which L=length of the vessel, $D_c$=diameter of the vessel, and the angles $\phi$ and $\theta$ are the wrapping and orbiting angles respectively. This displacement is necessary to insure that the orbitally wrapped insulation ribbons are wound adjacent to each other insuring thus a continuous coverage of the container with insulation and minimizing useless insulation "pile-up."

For any given optimum orbital angle and speed relationship, as the insulation thickness increases, the uninsulated gap between the neck tube and the nearest adjacent layers of insulation increases. This could cause a substantial drop in the insulation efficiency of the system if it were allowed to remain uninsulated. This problem has been overcome by a later embodiment of the invention as will be explained with reference to FIGS. 6 and 8.

Figure 6:
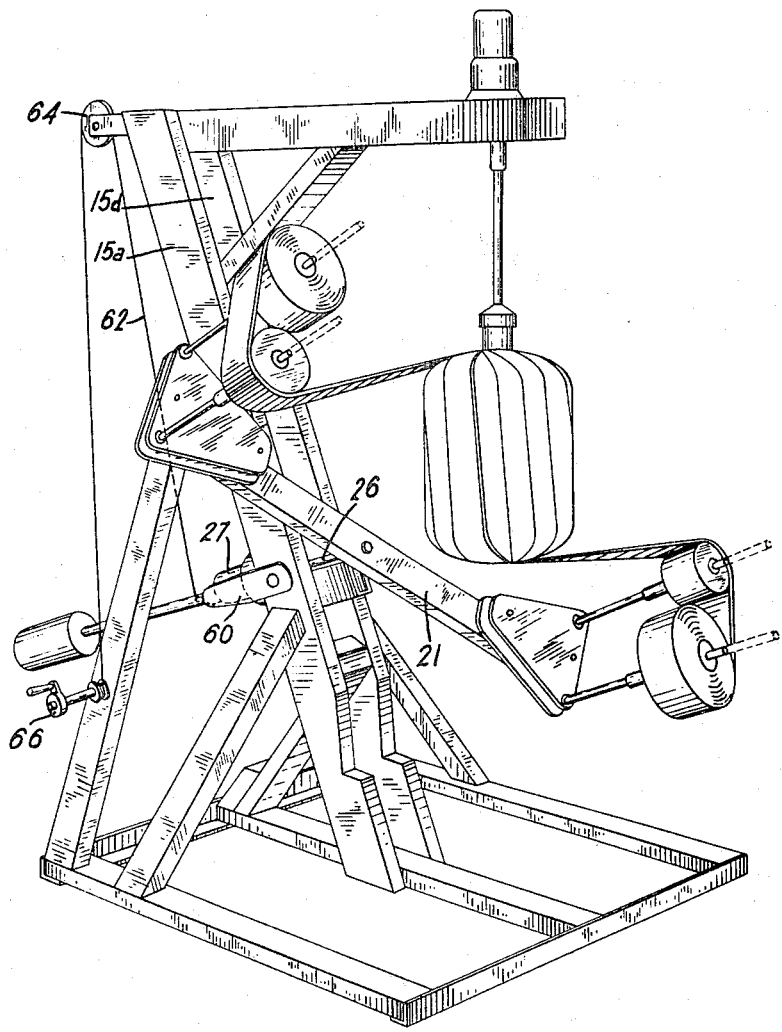
FIG. 6 is an isometric view of one side and the front side of still another modification of the FIG. 1 insulation wrapping machine.

FIG. 6 illustrates a modification to the wrapping machine shown in FIG. 2, for enabling the adjustment of the orbital angle $\theta$. This may be accomplished by providing means for pivoting the shaft 26 and the drive 27 which are connected to motion arm 21. The drive unit 27 may, as shown, be mounted on the rear end of a U-shaped frame 60 which is pivotally connected to the vertical upright frame members 15a and 15b. One end of a cable 62 may be fastened to the rear end of U-shaped frame 60, with its other end connected over pulley 64 to a hand cranked winch unit 66 which is secured to the main frame. Thus by winding and unwinding the cable 62, the orbital angle may be incrementally adjusted to any desired angle within the usually desired range of 8–30 degrees. Vertical rotatable shaft means have not been illustrated in the interest of simplicity. Such means could be identical to shafts 35 and 36 as shown in FIGS. 1 and 2.

As illustrated in FIGS. 1 and 2, the vessel 10 and the reel-mounted rolls 17–20 are driven separately. Separate drive means for vertically oriented fibrous sheet roll 37 and metal foil roll 38 are not necessary because the composite insulation 39 is drawn from the rolls onto the cylindrical side wall 10a by the vertically rotating vessel 10. It is also possible to drive the vessel and all insulation layer rolls from the same power source as, for example, depicted in the FIG. 3 embodiment. Corresponding elements have been identified by the same numbers as in FIGS. 1 and 2 for purposes of clarity. Referring now to FIG. 3, motion arm shaft 26 is driven by motor drive 50 through V-belt 51 and variable speed pulley 52. Vessel 10 is likewise driven by motor drive 50 through pulley 52, V-belt 53, variable pulley 54, V-belt 55 and sheave 56, the latter being connected to vessel 10 through shaft 11. In this manner, both the rolls 17–20 and vessel 10 can be driven from the same power source, each having different rotational speeds.

It will be apparent from the foregoing description that the receptacle of this invention is fabricated by applying thermal insulation to the periphery of a vessel having a cylindrical side wall and outwardly protruding convex-shaped end walls. To do this the vessel is rotated on its end-to-end axis and a first composite strip formed of a low thermally conductive material layer and a radiation-reflective material layer is orbitally wrapped around the vessel periphery from one end to the other end of the rotating vessel. This wrapping is at acute angle to the vessel end-to-end axis so as to provide an overlap between adjacent edges of adjacent orbit strips and cover the entire vessel periphery. A second composite of a low thermally conductive material layer and a radiation-reflective material layer is spirally wrapped around only the cylindrical side wall of the rotating vessel so that a layer is contiguously associated with the opposite type layer of the first composite strip. That is, either a low thermally conductive material layer of the first composite strip is contiguous with a radiation-reflective layer of the second composite, or a low thermally conductive material layer of the latter is contiguously positioned to a radiation-reflective layer of the first composite strip.

Figure 4:
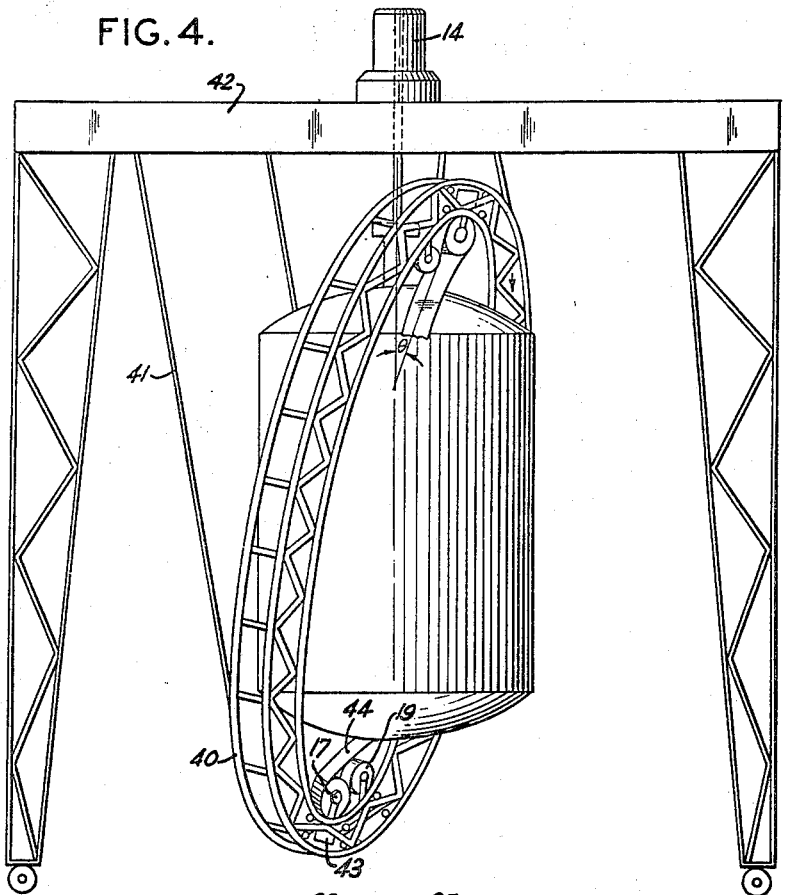
FIG. 4 is a longitudinal elevation view of the front side of still another modification of the FIG. 1 insulation wrapping machine.

FIG. 4 illustrates an apparatus that is particularly advantageous for wrapping larger size vessels, for example, those having a liquid capacity on the order of 10,000 liters. In this figure the rotating arm 21 of FIGS. 1–3 is replaced by the circular track 40, preferably constructed of light weight aluminum. This apparatus eliminates the need for fabricating large floor foundations necessary to support the overhanging and canti-levered supports of FIGS. 1–3 for the vessel and the rotating arm of the rolls. In this respect it is to be noted that the track 40 is supported by a plurality of suspension ties 61 which in turn are connected to the portable overhead member 62 thus yielding greater flexibility to the system. It should be understood that the suspension ties may be adjusted so as to properly position the track 40 to yield the desired angles $\theta$ and $\phi$ with respect to the axis of the vessel. Track 40 contains a suitable trolley 63 which may be driven by a suitable electric motor (not shown). Rolls 17 and 19 are in turn connected to the trolley 63 so as to be capable of applying the composite insulation layer 64 as the vessel is rotated by drive 14 and the trolley is driven around track 40 by the electric motor. Again vertical rotatable shaft means have not been illustrated in the interest of simplicity. Such means could be identical to shafts 35 and 36 as shown in FIGS. 1 and 2.

Figure 5:
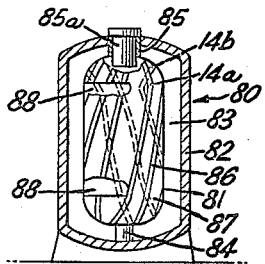
FIG. 5 is a longitudinal elevation view of a double-walled container according to the invention, certain parts being shown in cross-section.

FIG. 5 illustrates a novel double-walled liquefied gas container 80 which is an embodiment of this invention, as previously broadly described. The inner vessel 81 contains a low-boiling liquified gas as for example liquid oxygen, nitrogen, helium and the like. Vessel 81 having a cylindrical side wall and outwardly protruding convex-shaped end walls is surrounded by an outer casing 82 with an annular evacuable space 83 therebetween. During storage of low boiling liquefied gases, space 83 is maintained at a pressure below about 100 microns and preferably below 25 microns. Inner vessel 81 is supported and stabilized by suitable means as, for example, bottom tube 84 and top neck tube 85, and various conduits and valving for introduction and discharge of fluid may be employed, as will be understood by those skilled in the art. These elements have not been shown in the interest of simplicity and do not constitute parts of the invention. Suitable piping and valving is, for example, illustrated and described in U.S. Patent No. 2,968,163 to J. H. Beckman. Alternatively top neck tube 85 may be closed by removable plug 85a preferably filled with thermal insulation material as described more completely in U.S. Patent No. 3,207,354 to R. P. Skinner et al.

At least two composite strips 86 and 87 of fibrous sheeting underlayer 14b and metal foil 14a extend longitudinally around the periphery of the inner vessel 81 in intersecting directions. Although one composite strip is shown for purposes of simplicity, it is to be understood that strips 86 and 87 are preferably of sufficient length to substantially fill the evacuable annular space 83 between the inner vessel 81 and outer casing 82.

The composite insulation strips 86 and 87 are preferably wrapped around inner vessel by the previously described method wherein at least two composite strips of fibrous sheeting underlayer and metal foil are provided on opposite sides of the vessel. One end of each composite strip is secured to the vessel surface and the vessel is vertically rotated. Simultaneously, the strips are orbited around the perimeter of the rotating vessel and contiguously delivered to the vessel from the top to the bottom thereof in intersecting angles, one composite strip crossing over the other. Alternatively, a series of shorter strips may be employed with gaps therebetween as applied on the vessel surface. In this embodiment, the loose ends of the shorter strips may be secured to such surface before starting deposition of the next succeeding strip. One advantage of this arrangement is greater wrapping flexibility.

The composite criss-cross insulation is preferably applied to inner vessel 81 by the wrapping apparatus of the present invention, as exemplified by the machines shown in FIGS. 1–4 and 6–8. It will be appreciated, however, that hand wrapping may be alternatively employed.

Simultaneously or alternately the second composite 88 of fibrous sheeting and metal foil is spirally wound around only the cylindrical side wall of the inner vessel 81 with a component layer contiguously associated with the opposite-type layer 14a or 14b of the first composite strips 86 and 87.

The fibrous sheeting may, for example, comprise uncompressible paper-type material or compressible "mat-type" material such as glass fiber, preferably having fiber diameters of less than 50 microns. Also, such fibrous materials preferably have a fiber orientation substantially perpendicular to the direction of heat flow across the insulation space. The metal foil may, for example, be aluminum, copper, tin, silver, gold or cadmium, aluminum being preferred. Metal foil sheets having a thickness of between about 0.2 millimeters and 0.002 millimeters are preferred.

The ratio of the quantity of orbitally applied insulation to the quantity of spirally applied insulation, when preformed simultaneously, is nearly a constant 2:1. In general, for the maximum insulation efficiency, the width of the strip for the orbital wrap is first chosen on the basis of the vessel geometry. Such things as curvature at the ends, and the diameter of the vessel and the vessel neck tube are considered. In general, the narrower the strip, the faster the build up at the ends, and therefore a greater amount of spiral is needed.

To illustrate the different types of insulation, a 500-liter vessel was wrapped with the novel combination insulation. The vessel had a 38-inch O.D. and a height of 36 inches. The width of the vacuum space at the sides was about equal to the width at the bottom. Two 3-inch wide aluminum ribbons were chosen for the orbital wrap. For the spiral wrap the aluminum foil was 23½ inches. The orbital and spiral wraps were applied simultaneously, two orbital wraps to one spiral wrap.

As another illustration a 31-liter vessel having an O.D. of 14 inches and a height of 15 inches was wrapped with the combination insulation. The vacuum space at the side had a width of 1½ inches, while at the bottom it was 1¼ inches. The width of the aluminum ribbon for the orbital wrap was 2½ inches. In this case the wraps had to be alternated because the spiral wrap at the prevailing constant rate in simultaneous applications with the orbital wrap was not enough to fill the vacuum space at the sides.

The wrapping procedure was as follows:

(1) The vessel was wrapped for 60 revolutions of the orbit arm with the insulation from both the orbit rolls and the spiral rolls being applied simultaneously.

(2) After 60 revolutions of the orbit arm, the glass and aluminum foil strips being applied from the orbit arm were detached from the vessel. The vessel was then rotated for 10 revolutions with the spiral rolls attached only.

The two steps were repeated four times. This provided forty-eight layers applied by orbital wrapping and sixty-four by spiral.

Figure 7:
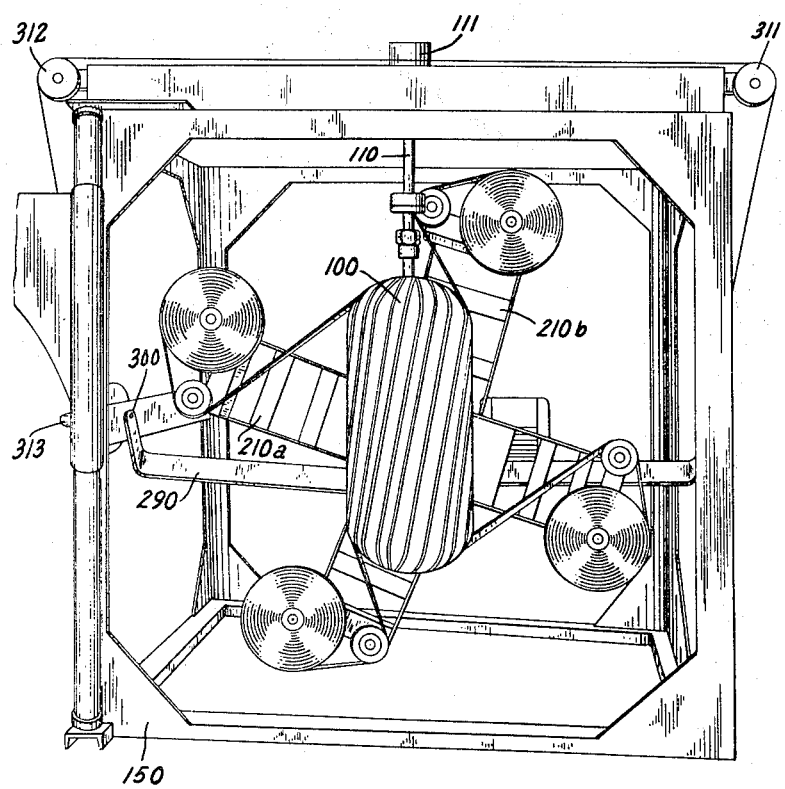
FIG. 7 is a longitudinal elevation view of the front of another wrapping machine embodiment.
Figure 8:
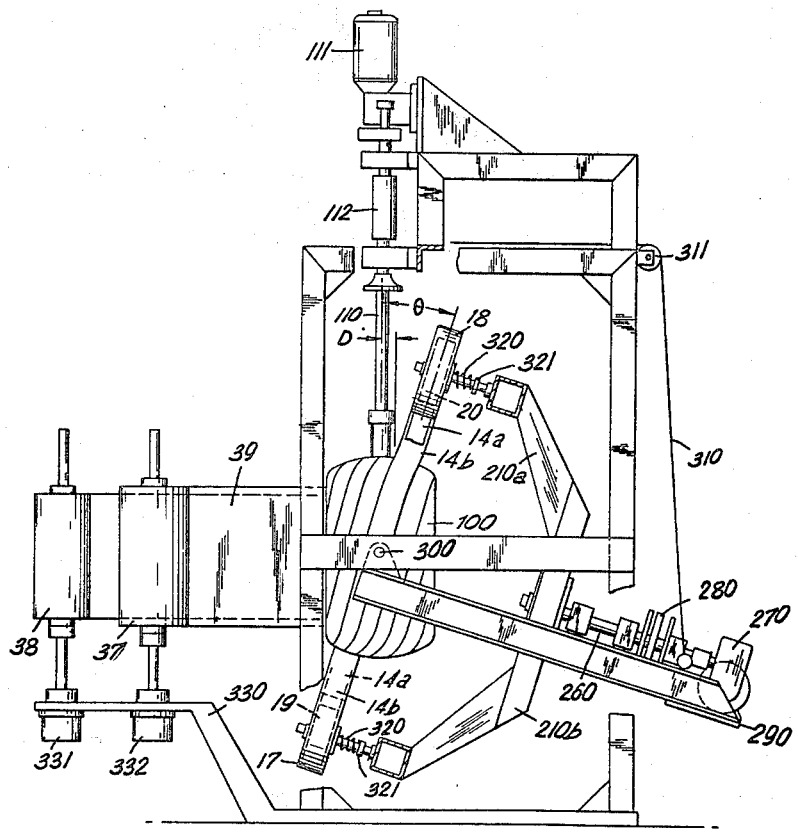
FIG. 8 is a side elevation view of the wrapping machine embodiment shown in FIG. 7.

FIGS. 7 and 8 illustrate another wrapping machine embodiment which is particularly useful in the wrapping of medium capacity vessels. The machine is comprised of a main frame 150 which carries a rotatable support 110 for a vessel 100. The rotatable support may be controllably driven by a motor 111 and rotatable support bushing 112. A pair of motion arms 210a and 210b are rotatably mounted on a channel-shaped orbital mechanism support frame 290 which in turn is pivotally attached to the sides of the main frame at 300. A pair of rolls is preferably rotatably mounted on and extend from each arm by means of respective rotatable shafts journalled in bearings near the ends of each motion arm. Each pair of rolls is required to feed the components of the composite insulation to the inner vessel 100 being wrapped. If the insulation is available prior to wrapping operation in a preformed composite strip, only one roll rotatably mounted near each end of the motion arms 210a, 210b would be required. The rolls extend from the motion arms inwardly toward the vertical axis of the container support 110 so as to be orbital about the vessel 100 when the motion arms 210a, 210b are rotated. As shown in FIG. 8, the motion arms 210a, 210b are controllably rotated by motor 270 through shaft 260 and slip clutch 280 which are supportably carried on the mid portion of the channel-shaped support frame 290 opposite the pivotal end. The pivot is preferably in lateral alignment with the vertical axis of rotatable support 110 as shown in FIG. 8. The end of the cross bar member opposite the pivotal end is held by a cable 310 which passes over pulleys 311 and 312 to the opposite side of the main frame 150 where it is attached to a hand cranking winch unit 313 (FIG. 7) such that the cross bar member 290 can be adjustably raised and lowered about pivot point 300. The included orbit angle $\theta$ formed between the vertical axis through the rotatable support and the planar orbital path of the rolls can be adjusted by means of the winch unit 313 in variable increments within 8 and 30 degrees.

As previously mentioned, care must be taken in applying tension to the insulation during wrapping in order to obtain good insulation efficiency and yet prevent tearing. It has been found that the rotation of the feed rolls about the container should begin slowly and then be increased in speed gradually until the desired speed is reached. There should be an absence of sudden jerking of the insulation during wrapping. This is avoided by the use of the slip clutch 280.

In order to insulate the gap normally formed between the neck tube of the vessel and the wrapped insulation as the insulation thickness increases, the offset distance "D" between the edge of the orbital wrapped ribbon and the centerline of the rotatable support 110 may be maintained constant while reducing the orbit angle $\theta$ by lifting the frame 290. Such adjustment will enable the container to be wrapped from top to bottom or, more accurately, from pole to pole with only a very small uninsulated gap around the neck tube. As in the FIG. 1 embodiment, a predetermined amount of tension may be applied to the rolls feeding the metal foil by means of compression springs 320 and collars 321.

It should be noted that the angles $\theta$ and $\phi$ and the ratio of the rotating speeds of the rolls and the vessel are determined by the same mathematical relationship previously described.

The advantages of several aspects of this invention were demonstrated in a series of production runs for manufacturing cylindrical shaped double-walled liquid nitrogen containers of 10-liter capacity. These particular small containers were to be used in widely scattered laboratories and required a relatively low evaporation rate of less than 0.6 lb. nitrogen per day from a total capacity of 17.8 lbs. liquid nitrogen. In the first production lot comprising eighty-one containers, glass fiber sheeting-aluminum foil composite layered insulation was orbitally wrapped around the inner vessel. After assembly with the outer casing and evacuation of the intervening space, these containers were found to have an average evaporation rate of 0.55 lb. nitrogen per day. The glass fiber sheeting was 2⅛-inches wide and the aluminum foil 1¾-inches wide.

After discovery of the present invention, apparatus similar to that depicted in FIG. 8 was constructed and used to wrap the same type of glass fiber sheeting-aluminum foil composite insulation around a production lot of sixty-three 10-liter nitrogen vessels. The specific sequence was as follows:

One 11-inch wide aluminum foil roll 38, and one 11½-inch wide glass fiber sheeting roll 37, were mounted on the spiral wrapping attachment 330. The two rolls were aligned with respect to each other and the composite layer 39, attached to the cylindrical side wall of vessel 100 with adhesive tape midway between the protruding convex-shaped top and bottom ends. Both sets of composite insulation ribbons 14a and 14b from orbiting rolls 17 and 19 mounted at the end of the motion arm 210b, and ribbons 14a and 14b from orbiting rolls 18 and 20 mounted at the end of the motion arm 210a, were attached respectively to the lower and upper end of the vessel 100 with adhesive tape. The orbit angle $\theta$ was set at 19° at the beginning of the wrap.

As the insulation thickness increased during the wrap, the angle $\theta$ was gradually decreased to 14½° toward the end of the wrap in order to maintain the distance D constant, i.e. to have zero gap between the edge of the orbitally wrapped ribbons and the neck tube of vessel 100. The latter was wrapped with 120 revolutions of the orbital arm at a speed of 25 r.p.m. This provided twenty-seven layers of composite insulation applied by orbital wrapping. While vessel 100 was rotating at an average speed of 3 r.p.m. fourteen layers of spirally wrapped composite insulation 39 were wrapped simultaneously with the orbital wrap. The total number of layers was forty-one. The thickness of the insulation mat around the container was ¾-inch, providing an average density of 55 layers per inch.

The desired density was maintained by the tension with which the insulation web 39 was wrapped. This tension was provided by the torque established by the magnetic brake 331. No other torque was necessary for the fibrous sheet roll 37 beyond the residual drag of the magnetic brake 332. In this embodiment the shafts were rotating with the rolls.

After assembly with the outer casing and evacuation of the intervening space, these containers were found to have an average evaporation rate of 0.48 lb. nitrogen per day. Since about one-half of the ambient heat inleak is through the neck tube and the other half through the evacuated annular insulation space, this represents an improvement of greater than 20% for the layered insulation composite by practicing the present invention.

The advantages of this invention were further demonstrated in the manufacture and testing of three cylindrical shaped double-walled liquid helium containers each with a 100-liter capacity. In view of far greater value of helium than nitrogen, it is essential to keep the evaporation rate at a minimum. The inner vessel of the first container was spirally wrapped around the cylindrical side walls with glass fiber sheeting-aluminum foil insulation along with intervening copper conductive shields. The ends were hand-folded and discs individually hand-positioned over the ends and each disc carefully interleaved with each spirally wrapped cylindrical layer. A period of 40 man-hours was reqlired to wrap this vessel and the evaporation rate of the assembled containers was 1.2% of the helium content per day.

A second liquid helium container of the same size was assembled using the same composite insulation but wrapped in the previously described orbital manner. The wrapping time was only 8–10 man-hours but the container's evaporation rate of 2% helium content per day was considered prohibitively high for commercial use.

A third liquid helium container of the same size as the first two containers was then constructed according to the principles of this invention using the same glass fiber sheeting-aluminum foil composite insulation in the following sequence:

Using apparatus similar to that illustrated in FIGS. 7 and 8, one 23½-inch wide aluminum foil roll 38 and one 24-inch wide glass fibrous paper sheeting roll 37 were mounted on the spiral wrapping attachment 330. Orbiting rolls 17 and 18 of 3½-inch wide glass fibrous paper ribbons were mounted at opposite ends of a single motion arm such as 210a, and orbiting rolls 19 and 20 of 3-inch wide aluminum foil ribbons were also mounted at opposite ends of the same motion arm. The wrapping operations were very similar to the previously described example.

The orbit angle $\theta$ was 13° at the beginning of the wrapping operation and 9° at the end of the wrap. These considerably smaller orbit angles were due to the fact that the length/diameter ratio of the helium vessel was much larger than the $L/D$ value of the small 10-liter nitrogen vessel. The geometry of this helium vessel was similar to vessel 100 depicted in FIG. 7. The vessel was wrapped with 440 revolutions of the orbiting arm at a speed of 6 r.p.m., providing eighty-eight layers of composite insulation applied by orbital wrapping. While the vessel was rotating on its vertical axis at an average speed of 0.6 r.p.m., forty-four layers of spirally wrapped composite insulation 39 were applied simultaneously with the orbital wrap. A total of 132 composite insulation layers were applied to the vessel walls with a thickness of 1⁷⁄₁₆-inches. The desired density of 90 layers per inch of this particular type of layered composite insulation was achieved by the torque action of magnetic brake 331. The assembled third container provided a helium evaporation rate of only 1.05% of the content per day, or an improvement in thermal insulating efficiency of over 20% as compared to the first two containers. Moreover, this improvement was achieved with 12–16 man-hours wrapping time—less than one-half the time required to spirally wrap and disc insulate the first container.

Although preferred embodiments of the invention have been described in detail, it is to be understood that modifications and variations may be effected without departing from the spirit and scope of the invention.

What is claimed is:

1. A container for storing low-boiling liquefied gases comprising an inner vessel with a cylindrical side wall of substantially circular cross-section and outwardly protruding substantially spherically convex-shaped end walls; an outer casing surrounding said inner vessel with an annular evacuable space between said vessel and casing; a multiplicity of first composite strips each formed of a low thermally conductive material type layer and a radiation-reflective material type layer wrapped in partial overlapping relation around the entire periphery of said inner vessel in said evacuable space with the longitudinal extent of each of said strips at an acute angle to the longitudinal direction of a plane containing the end-to-end axis of such vessel and passing through such strips; and a second composite strip of a low thermally conductive material type layer and a radiation-reflective material type layer spirally wound around only said cylindrical side wall of the inner vessel and having a layer contiguously associated with the opposite-type layer of said first composite strips.

2. A container according to claim 1 in which fibrous sheeting comprises said low conductive material layer of both said first composite strips and said second composite strip, and metal foil comprises said radiation-reflective material of both said first composite strips and said second composite strip.

3. A container according to claim 1 in which glass fibrous sheeting comprises said low conductive material layer of both said first composite strips and said second composite strip, and aluminum foil comprises said radiation-reflective material of both said first composite strips and said second composite strip.

4. A container according to claim 1 in which said low conductive layer of said first composite strips and said second composite strip is wider than said radiation-reflective material layer and positioned so as to extend outwardly beyond both longitudinal edges of such first strip and second composite strip and beneath said radiation-reflective material layer.

5. A container according to claim 1 in which flexible plastic film comprises said low conductive material layer of both said first composite strips and said second composite strip, and metal coatings on said plastic film comprises said radiation-reflective material of both said first composite strips and said second composite strip.

References Cited

UNITED STATES PATENTS

| 2,858,992 | 11/1958 | Wentz. | |
| 3,007,596 | 11/1961 | Matsch. | |
| 3,047,191 | 7/1962 | Young | 220—83 |
| 3,112,234 | 11/1963 | Krupp. | |
| 3,144,952 | 8/1964 | Uhlig et al. | |
| 3,321,101 | 5/1967 | Griffith | 220—3 |

FOREIGN PATENTS 999,574   7/1965   Great Britain.

DAVID M. BOCKENEK, Primary Examiner

J. R. GARRETT, Assistant Examiner

U.S. Cl. X.R.

220—83